(12) United States Patent
Feintuch

(10) Patent No.: US 10,979,457 B2
(45) Date of Patent: Apr. 13, 2021

(54) CLOUD SECURITY ASSESSMENT SYSTEM USING NEAR-NATURAL LANGUAGE COMPLIANCE RULES

(71) Applicant: DOME 9 SECURITY LTD., Tel Aviv (IL)

(72) Inventor: Roy Feintuch, San Francisco, CA (US)

(73) Assignee: CHECK POINT PUBLIC CLOUD SECURITY LTD, Tel Aviv (IL)

( * ) Notice: Subject to any disclaimer, the term of this patent is extended or adjusted under 35 U.S.C. 154(b) by 177 days.

(21) Appl. No.: 16/194,727

(22) Filed: Nov. 19, 2018

(65) Prior Publication Data

US 2019/0190953 A1   Jun. 20, 2019

Related U.S. Application Data

(60) Provisional application No. 62/607,932, filed on Dec. 20, 2017.

(51) Int. Cl.
*H04L 29/06* (2006.01)

(52) U.S. Cl.
CPC .............. *H04L 63/20* (2013.01); *H04L 63/10* (2013.01)

(58) Field of Classification Search
CPC ......... H04L 63/20; H04L 63/10; G06F 40/211
See application file for complete search history.

(56) References Cited

U.S. PATENT DOCUMENTS

| | | | |
|---|---|---|---|
| 7,324,912 B2 | 1/2008 | Gygi et al. | |
| 8,108,301 B2 | 1/2012 | Gupta et al. | |
| 8,756,209 B2 | 6/2014 | Do et al. | |
| 8,996,351 B2 | 3/2015 | Sharma | |
| 9,098,709 B2 | 8/2015 | Christodorescu et al. | |
| 9,356,961 B1 | 5/2016 | Todd et al. | |
| 9,471,666 B2 | 10/2016 | Singh et al. | |
| 9,613,200 B2 | 4/2017 | Boczek | |
| 9,667,733 B2 | 5/2017 | Dhawan et al. | |
| 9,680,843 B2 | 6/2017 | Murynets et al. | |
| 2004/0117151 A1 | 6/2004 | Wilson et al. | |
| 2008/0046784 A1 | 2/2008 | Gygi et al. | |
| 2008/0215517 A1 | 9/2008 | Johnson et al. | |
| 2011/0191277 A1 | 8/2011 | Dominguez et al. | |
| 2012/0023056 A1 | 1/2012 | Matignon et al. | |

(Continued)

OTHER PUBLICATIONS

OpenStack Wiki. "Congress". (2014) https://wiki.openstack.org/wiki/Congress (Year: 2014).*

*Primary Examiner* — Bradley W Holder
(74) *Attorney, Agent, or Firm* — Mark M. Friedman

(57) ABSTRACT

A cloud security assessment (CSA) system configured to identify and remedy a workflow executing in a cloud web service environment is provided. The CSA system includes a network interface configured to connect the CSA system to the cloud web service environment, wherein the cloud web service environment is defined by a cloud account; and a processor in operative communication with the cloud web service environment configured to receive a cloud account compliance rule for the cloud account in a structured near natural language, the compliance rule being applied by the CSA system on at least an instance of the cloud web service environment, wherein is processor is further configured to perform a remediation action based on a policy of the cloud account upon determination of a violation of the compliance rule.

16 Claims, 5 Drawing Sheets

(56) References Cited

U.S. PATENT DOCUMENTS

| | | | |
|---|---|---|---|
| 2012/0222084 A1* | 8/2012 | Beaty | H04L 43/0817 |
| | | | 726/1 |
| 2013/0013767 A1* | 1/2013 | Stober | G06F 9/5072 |
| | | | 709/224 |
| 2014/0040167 A1 | 2/2014 | Matignon et al. | |
| 2014/0130119 A1* | 5/2014 | Goldschlag | H04L 63/20 |
| | | | 726/1 |
| 2015/0095269 A1 | 4/2015 | Matignon et al. | |
| 2015/0286969 A1* | 10/2015 | Warner | G06Q 10/0633 |
| | | | 705/7.27 |
| 2016/0127418 A1* | 5/2016 | Maes | H04L 63/20 |
| | | | 726/1 |
| 2016/0162456 A1 | 6/2016 | Munro et al. | |
| 2016/0275303 A1* | 9/2016 | Narayanaswamy | H04L 9/0861 |
| 2017/0251013 A1* | 8/2017 | Kirti | H04L 63/1441 |
| 2017/0279826 A1* | 9/2017 | Mohanty | H04L 63/20 |
| 2017/0329788 A1* | 11/2017 | Grasselt | G06F 40/247 |
| 2018/0115551 A1* | 4/2018 | Cole | H04L 41/0893 |
| 2018/0287864 A1* | 10/2018 | Hockett | H04L 41/082 |

* cited by examiner

CLOUD SECURITY ASSESSMENT SYSTEM USING NEAR-NATURAL LANGUAGE COMPLIANCE RULES

CROSS-REFERENCE TO RELATED APPLICATIONS

This application claims the benefit of U.S. Provisional Application No. 62/607,932 filed on Dec. 20, 2017, the contents of which are hereby incorporated by reference.

TECHNICAL FIELD

The disclosure generally relates to a rule-based policy and compliance engine system for cloud security assessments.

BACKGROUND

Cloud services are well adopted information technology delivery models for software, platforms and infrastructure, delivered as a service. That is, they are typically provided by remote access to a cloud-based system rather than being deployed on premises. Software as a service (SaaS) is a business application delivered to customers as a service and fully operated by the application service provider which is fully responsible for all aspects of the application including resiliency and security. Infrastructure as a Service (IaaS) delivers lower level information technology (IT) services, such as storage, networking and compute. Platforms as a Service (PaaS) delivers IT platforms as a service. These platforms include services, such as databases, application servers, message buses and other similar technologies, usually run on the IT infrastructure. Serverless technologies are on the rise (e.g., Amazon® Web Services (AWS) Lambda) also provides the technology to run applications without installing and maintain an IT infrastructure.

Several vendors provide IaaS, PaaS, and serverless cloud services. While for the SaaS model the application vendor is responsible for all operational and security aspects, for platforms, serverless and infrastructure services, there is a shared responsibility model where the cloud vendor is responsible for the security of the cloud platform (physical infrastructure, facilities, physical networks and hardware security) and the customer is responsible for the security within the cloud application. That is, the customer controlled stack, such as cloud firewalls, cloud service settings and security policies, host/application firewall, operating system, database configuration and so forth are the responsibility of the customer.

Today, it is a standard practice for organizations to host mission critical, business applications in a cloud-computing platform, with high security and compliance requirements. Under the shared responsibility model, the cloud service providers are assuming responsibility for security and compliance of the cloud and customers are assuming responsibility for security and compliance within the cloud. An example model of such shared responsibility is shown in FIG. 5.

Achieving end-to-end secure deployments is complex and requires following multiple best practices as well as standard defined measures (such as requirements defined in HIPPA, PCI-DSS, NIST, and the like) driving many configuration and assurance measures to be properly taken.

In addition, organizations develop internal procedures and standards to achieve proper controls of their cloud IT usage for security purposes, cost control and compliance adherence. Building, maintaining and controlling security in the cloud under the customer's responsibility is a complex task that requires automated processes, checks and controls, requiring expensive development by each organization making use of cloud services.

The complexity is high due to the requirement to have deep knowledge of dedicated programming languages for the deployment of security rules, typically outside of the abilities of most organizations wishing to deploy such cloud-based solutions. Such systems may require users to develop additional checks and signatures as plugins developed in software development languages. Further, such plugins would require different software for different cloud services providers. As such, development of cloud service would require extensive development skills and large code base development and maintenance.

Cloud security teams are experts at defining security measures, controls and process, but usually lacks the development skills required to develop systems with software. Thus, pace of development such plugin may not meet the pace at which security threats are evolving.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a cloud security assessment (CSA) system configured to identify and remedy at least a workflow executing in a cloud web service environment. The CSA system comprises an inventory subsystem configured to manage and store therein information regarding client accounts to at least one cloud providers communicatively connected to the CSA system over a network, the client accounts corresponding to at least one client communicatively connected to the CSA system over the network, wherein a client account defines a cloud environment on with at least one of the one or more cloud providers; an assessment subsystem configured to automatically assess based on a plurality of policy rules the configuration and operation of the cloud environment of at least one of client and providing assessment results; and a remediation subsystem configured to use results from the easements provided by the assessment subsystem and perform at least one remediation action when determining that such one or more remediation actions are necessary.

Certain embodiments disclosed herein also include a cloud security assessment (CSA) system configured to identify and remedy a workflow executing in a cloud web service environment. The CSA system comprises a network interface configured to connect the CSA system to the cloud web service environment, wherein the cloud web service environment is defined by a cloud account; and a processor in operative communication with the cloud web service environment configured to receive a cloud account compliance rule for the cloud account in a structured near natural language, the compliance rule being applied by the CSA system on at least an instance of the cloud web service environment, wherein is processor is further configured to perform a remediation action based on a policy of the cloud account upon determination of a violation of the compliance rule.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION

Figure 1:
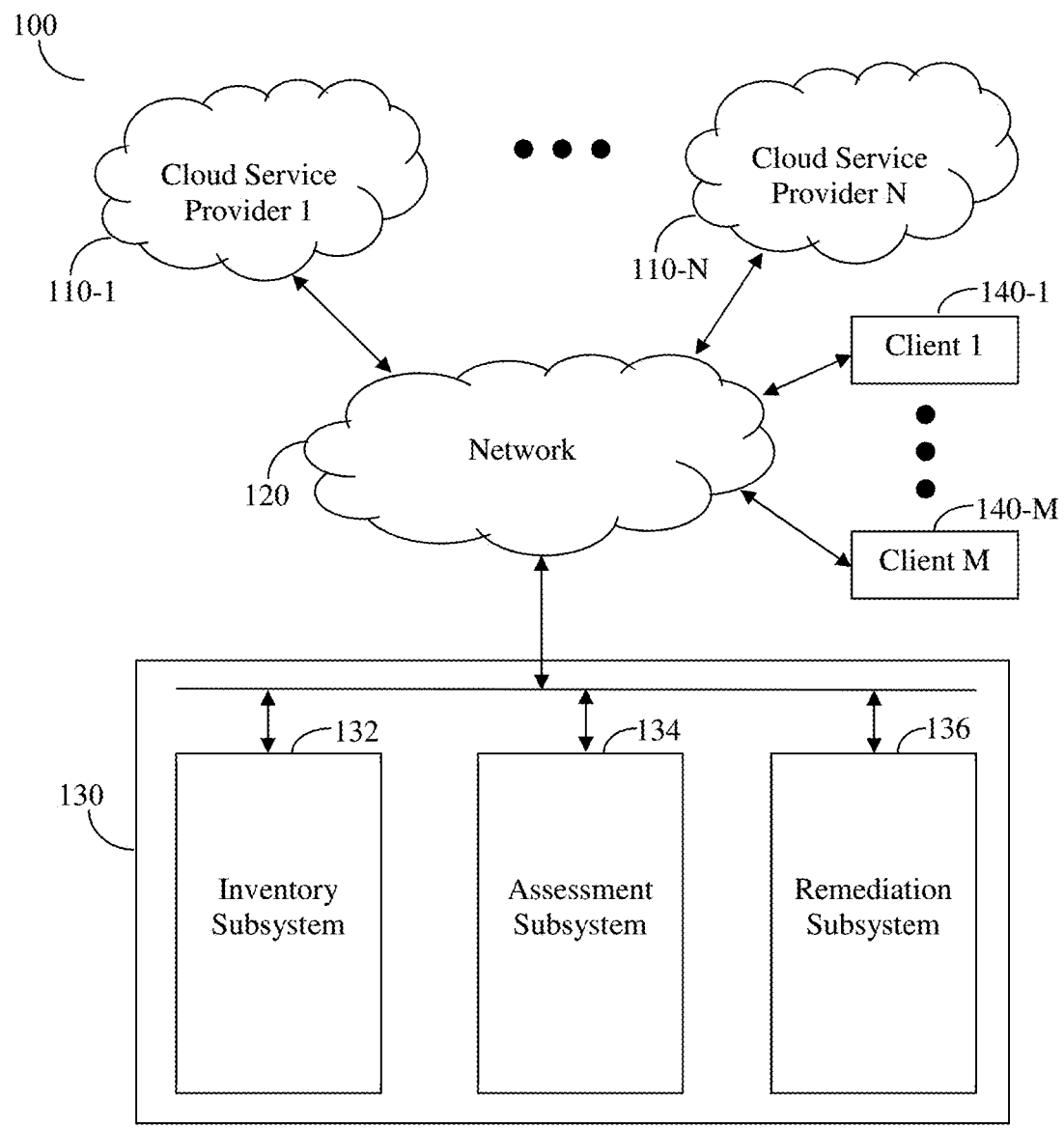
FIG. 1 is a diagram of a cloud-based environment utilized to describe the various embodiments.

The various embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

According to some example embodiments the disclosed solution is designed to ensure security and compliance in the cloud, covering known best practices, compliance standards as well as customer defined controls which requires no heavy lifting coding, requiring minimum to no development effort, and can be implemented, maintained and executed easily and at a low cost by security personnel with minimal software development skills. The disclosed solution is further designed to cover multiple different cloud services providers.

In an example embodiment, the disclosed solution is realized as a cloud security assessment (CSA) system including an inventory subsystem, an assessment subsystem and a remediation subsystem. The CSA system is connected via a network to one or more cloud service providers and one or more clients using the cloud services to create a cloud-based environment. A snapshot of the configuration of each cloud-based environment and the respective client account details are handled by the inventory subsystem. The assessment subsystem contains a storage with near natural language rules that are the policy which a client may wish to impose on a particular cloud-based environment, the near natural language allowing for easy development and deployment of the rules in a world of multiple cloud service providers. Based on assessments made by the assessment subsystem the remediation subsystem performs remediation actions which include stopping, disconnecting, or disabling access, of at least an instance of the client's executing in the cloud environment.

FIG. 1 is an example diagram of a cloud-based environment 100 according to an embodiment. The environment 100 includes multiple cloud services providers (CSPs) 110 and a cloud security assessment (CSA) system 130 according to an embodiment. The CSPs 110-1 through 110-N, where N is a positive integer, provide cloud services. Example for such cloud services include, but are not limited to, Amazon® Web Services (AWS) from Amazon, Microsoft® Azure®, and Google® Cloud Platform.

The CSPs 110-1 through 110-N are connected to the CSA system 130 through a network 120 which may include, but is not limited to, the Internet, Intranet, the world wide web (WWW), local area network (LAN), metro area network (MAN), wide area network (WAN), and the like, as well as being wired or wireless in whole or in part, and any combinations thereof.

In an example embodiment, the CSA system 130 includes an inventory subsystem 132, an assessment subsystem 134, and a remediation subsystem 136, which are described herein in further detail. One or more clients 140, designated 140-1 to 140-M, where M is a positive integer, are also connected to the network 120. A client 140, for example, client 140-1, may wish to have services provided by one or more of the CSP 110 and for that purpose opens the necessary accounts that allow such access and use of resources provided by each CSP 110. As noted it is the client's responsibility to provide at least some of the security measures for the account opened and it is there where CSA system 130 provides its capabilities, as further explained herein.

Figure 2:
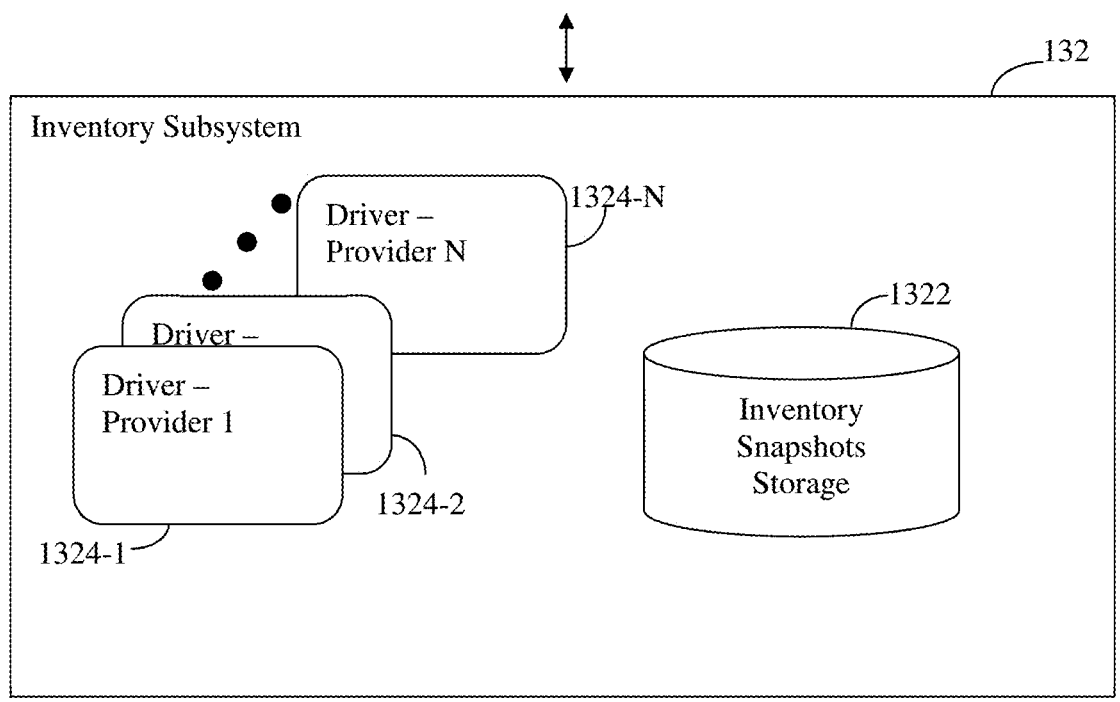
FIG. 2 is a block diagram of an inventory subsystem of a cloud security assessment (CSA) system according to an embodiment.

FIG. 2 depicts an example block diagram of an inventory subsystem 132 of the CSA system 130 according to an embodiment. The inventory subsystem 132 includes drivers 1324, one for each of the CSP 110 and an inventory snapshot storage 1322 that holds therein information of the client accounts opened by each of the clients 140 with respect of each of the CSP 110. Thereby information regarding the CSA system 130 configured by the user with each of the CSP 110 is available to the CSA system 130, and allows the operation of the CSA system 130 in the manner described herein.

Figure 3:
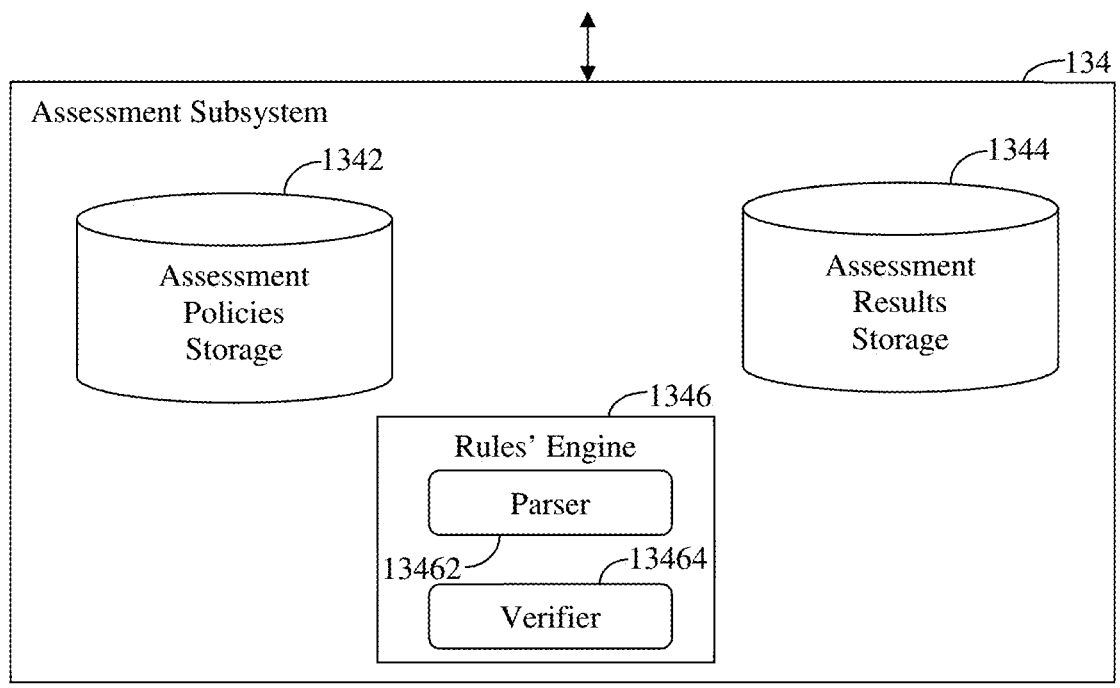
FIG. 3 is a block diagram of an assessment subsystem of the CSA system according to an embodiment.

FIG. 3 depicts an example block diagram of an assessment subsystem 134 of the CSA system 130 according to an embodiment. The assessment subsystem 134 includes an assessment policies storage 1342 that stores the policies which depict expected proper and/or improper conduct of an account. A rule engine 1346 includes a parser 13462 and a verifier 13464. The rules are provided in a near natural language format, as discussed in more detail herein, and are parsed by the parser 13462. The verifier 13464 is configured to use the parsed results to verify versus the expected results whether the conduct of the account is proper or not. The verifier 13464 is also configured interacts with the inventory storage subsystem 132 to perform the assessment for a given cloud account. The results of the assessment are stored in the assessment results storage 1344.

It should be note that the rule engine 1346 including the parser 13462 and verifier 13464 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The assessment policies storage 1342 may be magnetic storage, optical storage, and the like, and may be realized, for example, as flash memory or other memory technology, CD-ROM, Digital Versatile Disks (DVDs), or any other medium which can be used to store the desired information.

Figure 4:
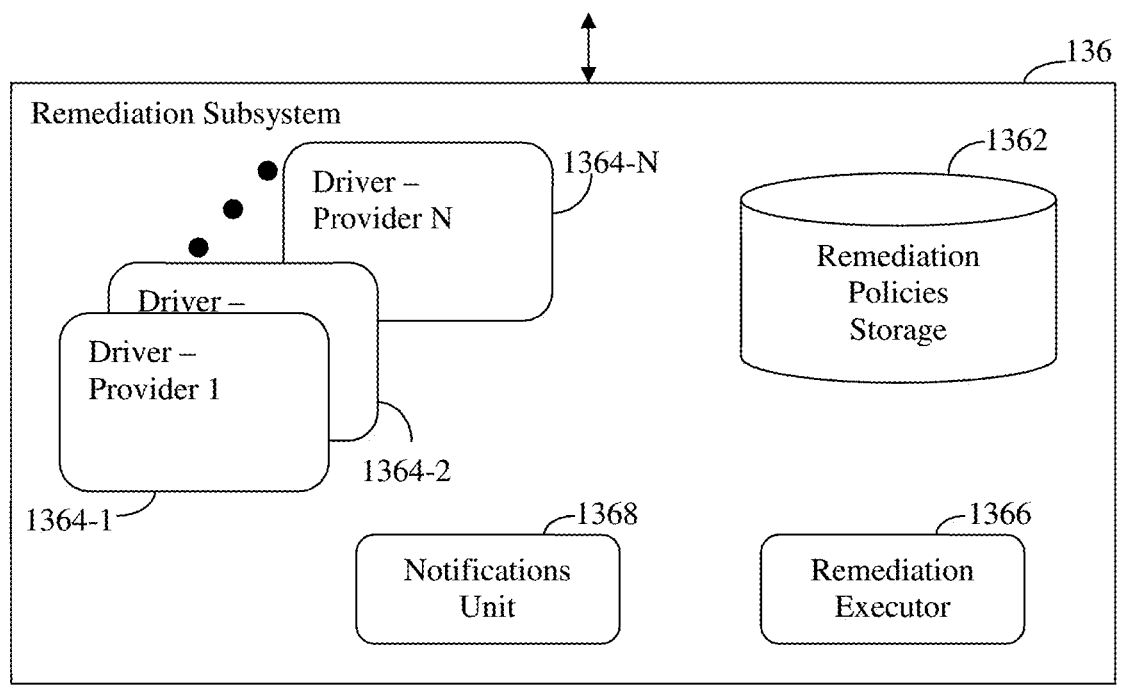
FIG. 4 is a block diagram of a remediation subsystem of the CSA system according to an embodiment.
Figure 5:
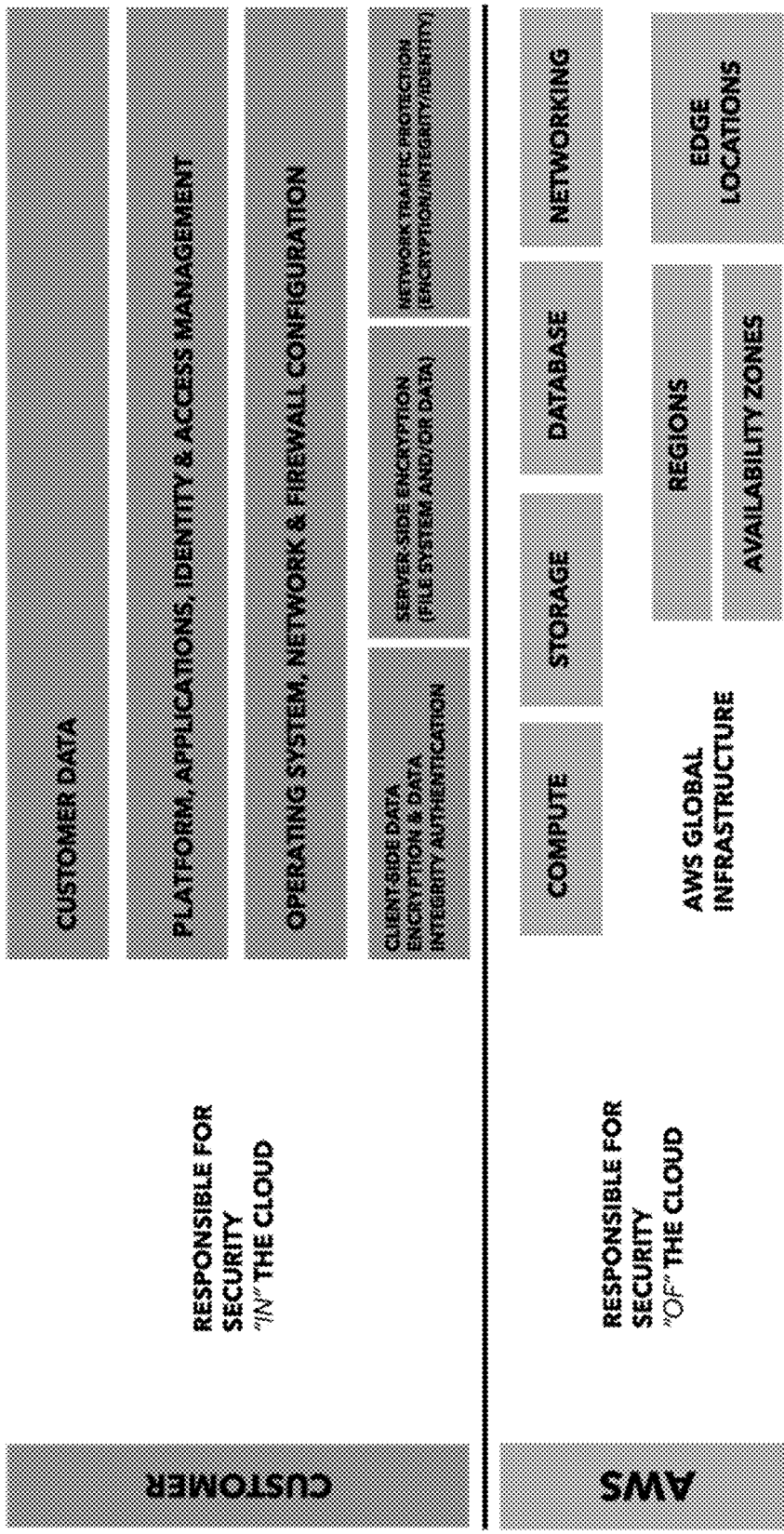
FIG. 5 is an example of the shared responsibility model for IaaS and PaaS.

FIG. 4 depicts an example block diagram of a remediation subsystem 136 of the CSA system 130 according to an embodiment. The remediation subsystem 136 is configured to use the assessment results stored in the assessment results storage 1344 to provide remediation for the purpose of fixing problems identified by the assessment subsystem 134.

The remediation performed by the remediation executor 1366, is based on remediation policies stored in the remediation policies storage 1362, and may include, but is not limited to, stopping execution of an instance of a cloud web service environment executing on a CSP 110, removing an instance of the cloud web service environment from the cloud web service environment executing on a CSP 110, quarantining an instance of the cloud web service environment from the cloud web service environment executing on a CSP 110, or disabling access to a cloud service of the cloud web service environment executing on a CSP 110. These remediation actions take place by using the account information provided by a client 140 and available from the inventory subsystem 132, and further using drivers 1364, where a driver is provided for each of the CSP 110.

The remediation subsystem 136 may further include a notification unit 1368 configured to provide a notification to the client 140 that has experienced an action performed by the remediation executor 1366 or, providing notification reflecting results of the assessments that are stored in the assessment results storage 1344. Notifications may be, but are not limited to, a short message system (SMS), email, alert pop-up on screen in a security and network control center (NOC) and the like.

The CSA system 130 is configured to use compact, near natural language to define policy rules which requires no coding skills and allows organizations to define security polices as a compliance bundles, execute the bundles as assessment reports, save the reports, schedule the reports and combine auto remediation workflows.

In an embodiment, the rule-based system, disclosed herein, is configured to cover multiple cloud providers such as AWS, Azure®, and Google® cloud. The details of the near natural language for such policies is describe in greater detail herein. The CSA system 130 is also configured to cover a wide range of cloud services, entities and settings, such as networking, storage, Identity management, logging settings, security and certificates settings and so forth.

According to an embodiment the CSA system 130 is configured to allow a scope-based assessment, i.e., an assessment based on parameters such as vendor, region, virtual private cloud, etc., or an all-encompassing assessment of a cloud environment for a client 140, for example, client 140-1. In a further embodiment, the near natural language rule-based policy driven CSA system 130 can validate and provide security review and approval workflow for deployments prior to the cloud environments being deployed.

In a further embodiment, when compared to writing a bunch of code to validate policies directly against CSP APIs, is that an intermediate object model can be provided using declarative rules. This extra layer of abstraction by means of declarative rules allows to take a blueprint plan of a cloud deployment, including one which has not even been deployed, convert it to the disclosed intermediate model and execute the same set of rules for the purpose of checking it.

In an embodiment, the near natural language for the policy rule is a cloud governance specification language (CGSL). To further illustrate the operation of CSA system 130 it is essential to understand the principles of the CGSL syntax which includes a core language which is augmented by a set of functions that add domain specific functionality, such as, but not limited to, internet protocol (IP) addresses and networking, strings matching, date and time, as well as others. A CGSL rule has, according to an embodiment, the following syntax:

<Target> should <Condition>

The Target is the entity type to be reasoned about (e.g., an instance, a SecurityGroup, etc.). This can be further refined to match a smaller set of entities by adding the where keyword. The formal definition is:

<entity_type> where <expression>

The entity_type is the pivot entity type that is being reasoned about, details of which are provided herein. The expression can be any complex CGSL expression to match on the target entity type. An example is:

SecurityGroup where name='default' should . . . .

Another example is:

Instance where (tags contain [key='env' and value='prod'] and not name='test') should . . . .

A condition is the actual rule, that thing checks the element which is desired to be tested. According to the CGSL the condition may be a complex expression.

The CGSL further allows for a variety of language expressions syntax. A property comparison expression have the following format:

<property_name> <comparison_operator> <expected_value> where, property_name is the relevant property of the entity being tested; comparison_operator is: =, <, >, !=, < >, <=, >=, like; and, expected_value is any expression to be tested against, and which could be a string, number, another property or a function result. Following are exemplary and non-limiting examples:

instance should have inboundRules.length <10 instance where image='ami-1234' should . . . .

instance where name like <% db %' should . . . .

The keyword 'have', for example, is not actually used by the parser 13462 and removed when processing the rule. It is provided so as to be able to write rules that are also readable and readily understood.

In order to identify if a property value Is included in a user defined list a syntax using in is provided and has the following format:

<property_name> in (val1, val2, val3, . . . )

Following are a couple of examples to is use:

instance should have image in ('ami-111', 'ami-222')

instance should have region in ('us_east1', 'us_west_2')

Another property of the CGSL is a collection property that contains an item given complex filter criteria. This rule verifies that a property of type list contains a specific item. The syntax allows building complex expressions to find/match this item. The formal syntax is:

<property_name> <contained-operator>[<expression>]

Where: property_name is the relevant property of the entity being tested; the containment-operator is one of the following: contain or with or contain-any which are syntactically identical and are provided so 'proper' English grammar can be used. If any of the collection elements will satisfy the query expression, then the entire contain statement is considered as satisfied. contain-all requires all elements in the collection to satisfy the expression; contain-none requires none of the elements in the collection to satisfy the expression; and, expression inside the [ ] block can be any complex CGSL expression and defines the query for which each collection item will be tested against. The following example iterates over each rule in the SecurityGroups's inboundRules collection. Each rule is matched against both port and scope properties:

SecurityGroup should have inboundRules with [port=22 and scope '0.0.0.0/0']

Another example is a nested expression where the outer 'with' iterates over each nic in the nics collection, where the inner 'contain-any' iterates over each security group:

Instance should not have nics with [SecurityGroups contain-any [hame='default']]

A check is also provided to check the existence of a property and that it is not an empty property. The CSA system 130 is adapted to understand 'emptiness' regarding each property type, ex: an empty collection is considered empty, as well as empty object, null, 0, empty string etc. The syntax is simply:

<property_name>

An example is:

instance should have vpc

Note that the above-expression is identical to the expression "instance should vpc", which is significantly less readable.

The CGSL, as may be expected also allows for complex logical expressions using the operators and, or and not. The and operator verifies that both sides of the operator are true; the or operator verifies that either side of the operator is true; while, the not operator returns a true if the following expression is false and vice versa. These keywords have the syntax format of:

and, or, not, (<expr>)

These may be used in complex sentences such as:

SecurityGroup should not have inboundRules with [port=22 and scope='0.0.0.0/0']

According to an embodiment the core CGSL syntax is enriched by internal functions that provide domain specific functionality in multiple areas such as: IP addresses, dates, string matching, and more. The syntax used is:

<property_name>   <function_name>   (<param1>, <param2>, . . . )

Where: property_name is the property/object we wish to operate on (similar to functions in object-oriented languages); function_name is the name of the functions from the above list; and params are the required parameters according to the type of the function separated by commas. In some instances functions specific to a CSP is provided. The details of such functions are outside the scope of this patent and are therefore not included herein.

Following are several examples of rules that provide additional support to the advantages provided by the instant invention. For example, according to an embodiment the CDA system 130 can verify that no instance holding sensitive or regulated data is exposed to the internet using the rule:

RDS where tags with [key='PCI'] should not have isPublic

This rule means that a certain instance of a database (RDS) tagged as a PCI regulated instance, it shouldn't be a public database. When such a database is detected the companies, risk is very high and therefore an immediate action may be taken to disconnect the database from the network with the disconnect instance action invoked by the remediation executor 1366.

As another example, if the database is not properly classified for its usage and is a public database it may indicate a potential risk. The first step would be to notify the owner that the database should be properly tagged, allow a few days for remediation and take an action only if the classification was not addressed within a particular time span. According to an embodiment the CSA system 130 can implement such a complex workflow in the manner described herein.

To can be achieved using the rule is:

RDS where isPublic and not tags with [key=markedForStop] should have tags with [key=classification]

Any public database not adhering to the policy (i.e., it is not properly tagged for classification and not already marked for shutdown) will be first marked for shutdown. When the remediation period has passed, a second check is executed using the rule:

RDS where isPublic and tags with [key=markedForStop] should have tags with [key=classification]

That is, the rule checks for any public database that was already marked for shutdown and is still not adhering the policy (i.e., is not properly tagged for classification) will physically shutdown with an action stop_instance. At the same time, those instances that were properly tagged will be unmarked for shutdown using the following rule:

RDS where isPublic and tags with [key=markedForStop] should not have tags with [key=classification]

which checks for any public database that was already marked for shutdown and now has the classification tag. Those will now be unmarked for shutdown with an action unmark_for_stop. These physical states changing remediation actions are invoked by the remediation subsystem 136 based on the results from the assessment subsystem 134.

It should be appreciated that remediation actions possible according to the principles discussed herein are numerous. Therefore, by way of example but not by way of limitation, several examples for automatic remediation actions according to the invention follow. Remediation actions relevant to compute instances may therefore include, but not limited to, stop an instance, quarantine and instance from the network, and tag an instance. For remediation actions relevant to cloud users, e.g., IAM user) may therefore include, but not limited to, add to group, remove from group, and quarantine user.

A quarantine of a user may include stripping all permissions from the user. Remediation actions relevant to cloud firewall rules may therefore include, but not limited to, delete a rule, change a rule's scope or limit or otherwise decrease a rule's scope. For example, a rule may be changed from allowing access to the entire internet [0.0.0.0/10] to allowing only a local narrow scope [192.168.0.0/16].

The various embodiments may be implemented as hardware, firmware, software, or any combination thereof. Moreover, the software is preferably implemented as an application program tangibly embodied on a program storage unit or tangible computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers may be combined into one or more integrated servers. Furthermore, a non-transitory computer readable medium is any computer readable medium except for a transitory propagating signal. The display segments and mini-display segments may be shown on a display area that can be a browser or another other appropriate graphical user interface of an internet mobile application, either generic or tailored for the purposes described in detail hereinabove.

All examples and conditional language recited herein are intended for pedagogical purposes to aid the reader in understanding the principles and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A cloud security assessment (CSA) system comprising: a hardware processor:
   (a) an inventory subsystem, executing on the hardware processor, configured to manage and store information regarding client accounts to each of at least one or more cloud service providers (CSP) communicatively connected to the CSA system over a network, the client accounts corresponding to at least one client communicatively connected to the CSA system over the network, wherein a client account defines a cloud environment on at least one of the cloud service providers;
   (b) an assessment subsystem, executing on the hardware processor, configured to assess, based on parsing a plurality of near natural language policy rules, configuration and operation of the cloud environment of at least one of the client accounts and provide assessment results identifying conduct of the at least one client account; and
   (c) a remediation subsystem, executing on the hardware processor, configured to identify if one or more remediation actions are necessary, based on the assessment results from the assessments provided by the assessment subsystem.

2. The CSA system of claim 1, wherein the remediation subsystem:
   determines that one or more remediation actions are necessary, and
   provides remediation to fix problems identified by the assessment subsystem.

3. The system of claim 1, wherein the one or more remediation actions is selected from the group consisting of:
   (a) stopping execution of an instance of the cloud environment, and
   (b) removing an instance of the cloud environment.

4. The CSA system of claim 1, wherein the one or more remediation actions quarantines an instance of the cloud environment.

5. The system of claim 1, wherein the one or more remediation actions disables access to a cloud service of the cloud environment.

6. The system of claim 1, wherein the plurality of near natural language policy rules are in a structured language that is based on a predetermined syntax.

7. The system of claim 6 wherein the predetermined syntax is of the format "<Target> should <Condition>", where "<Target>" is an entity type and "<Condition>" is a rule that checks the "<Target>".

8. The system of claim 1 further including a verifier, executing on the hardware processor, configured to directly execute the assessment subsystem's parsed plurality of near natural language policy rules to verify versus expected results whether conduct of a client account is proper.

9. A computer usable non-transitory storage medium having a computer program embodied thereon for causing a suitably programmed cloud security assessment (CSA) system to identify if one or more remediation actions are necessary by performing the following steps when such program is executed by a hardware processor, the steps comprising:
   (a) managing and storing on an inventory subsystem information regarding client accounts to each of at least one or more cloud service providers (CSP) communicatively connected to the CSA system over a network, the client accounts corresponding to at least one client communicatively connected to the CSA system over the network, wherein a client account defines a cloud environment on at least one of the cloud service providers;
   (b) assessing, by an assessment subsystem, based on parsing a plurality of near natural language policy rules, configuration and operation of the cloud environment of at least one of the client accounts and providing assessment results identifying conduct of the at least one client account; and
   (c) providing, by a remediation subsystem, using the assessment results from the assessment subsystem, identification if one or more remediation actions are necessary.

10. The computer usable non-transitory storage medium of claim 9, wherein the computer program is executed to further cause the remediation subsystem to:
    determine that one or more remediation actions are necessary, and
    provide remediation to fix problems identified by the assessment subsystem.

11. The computer usable non-transitory storage medium of claim 9, wherein the computer program is executed to further cause one or more remediation actions selected from the group consisting of:
    (a) stopping execution of an instance of the cloud environment, and
    (b) removing an instance of the cloud environment.

12. The computer usable non-transitory storage medium of claim 9, wherein the computer program is executed to further cause one or more remediation actions that quarantines an instance of the cloud environment.

13. The computer usable non-transitory storage medium of claim 9, wherein the computer program is executed to further cause one or more remediation actions that disables access to a cloud service of the cloud environment.

14. The computer usable non-transitory storage medium of claim 9, wherein the near natural language policy rules are in a structured language that is based on a predetermined syntax.

15. The computer usable non-transitory storage medium of claim 14, wherein the predetermined syntax is of the format "<Target> should <Condition>", where "<Target>" is an entity type and "<Condition>" is a rule that checks the "<Target>".

16. The computer usable non-transitory storage medium of claim 9, wherein the computer program directly executes the assessment subsystem's parsed plurality of near natural language policy rules to verify versus expected results whether conduct of a client account is proper.

* * * * *